United States Patent Office 2,775,128
Patented Dec. 25, 1956

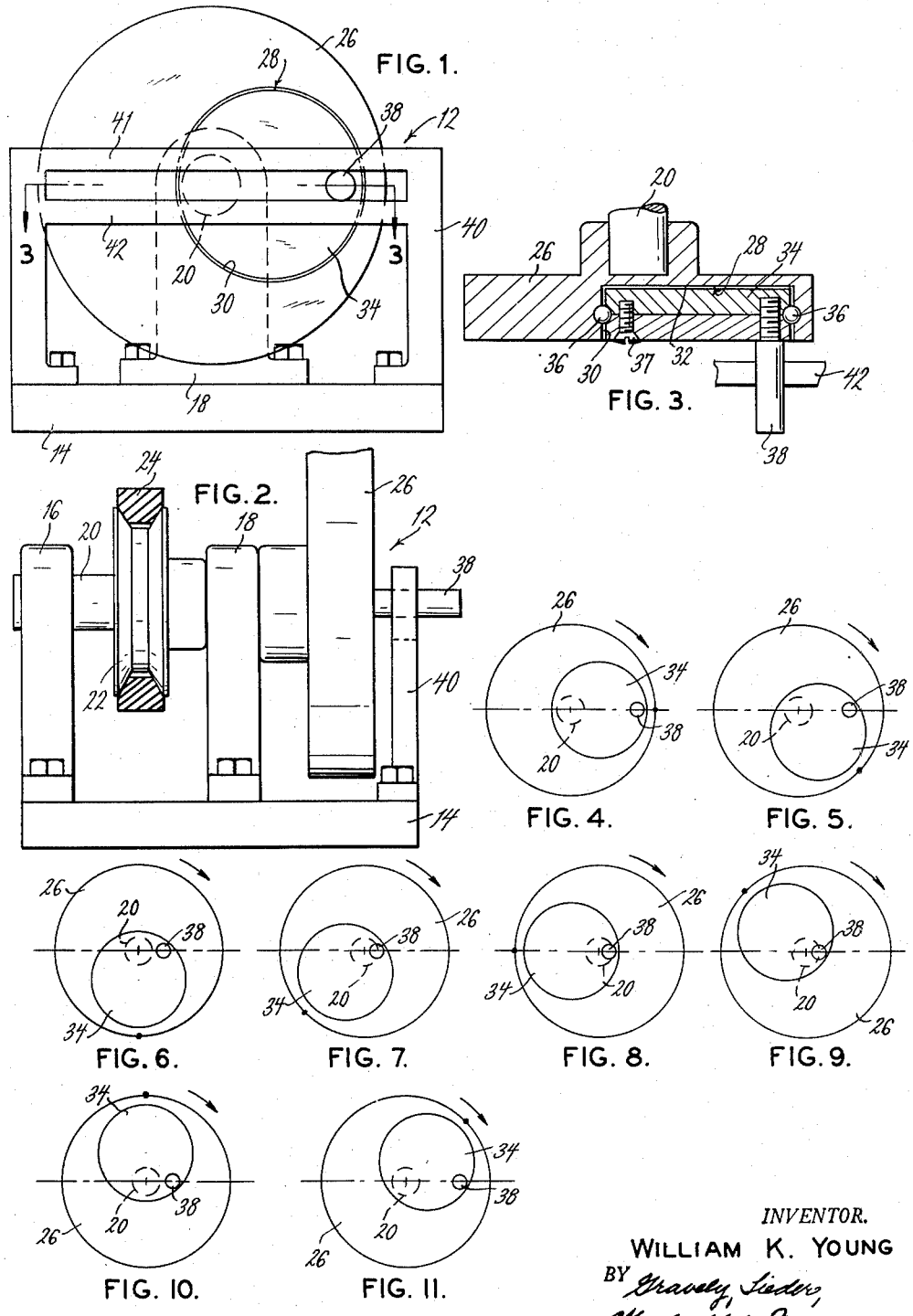

2,775,128

DEVICE FOR CHANGING CIRCULAR MOTION TO RECTILINEAR MOTION

William K. Young, Rockford, Ill.; The Third National Bank of Rockford, executor of said William K. Young, deceased Application July 14, 1952, Serial No. 298,794

4 Claims. (Cl. 74—49)

The present invention relates generally to the mechanical movement art and more particularly to a novel device for changing circular motion to rectilinear motion.

In practically all of the known devices for changing circular motion to rectilinear motion there is a considerable amount of thrust at right angles to the direction of linear movement (side thrust) which causes appreciable wear in the reciprocating parts of the mechanism. Perhaps the best known example of this side thrust and its accompanying wear is the cross block of the conventional steam engine.

Various eccentric type mechanisms have been used for changing circular motion to rectilinear motion but these too have side thrust problems and have the additional disadvantage of being unbalanced. Consequently, they can be operated only at relatively low speeds.

Furthermore, in the known mechanisms for changing circular motion to rectilinear motion, the speed-force characteristic are the same at both ends of the linear stroke.

It is an object of the present invention, therefore, to provide a novel device for changing circular motion to rectilinear motion which eliminates substantially all side thrust. More particularly it is an object to provide such a device which includes two members mounted for relative rotational movement and having antifriction bearing means therebetween so as to reduce the side thrust to a point where it is totally eliminated for all practical purposes.

Another object is to provide a novel eccentric type device for changing circular motion to rectilinear motion which is in substantially complete balance in all rotated positions, whereby its maximum speed is limited only by the strength of the material employed in its construction.

Another object is to provide a novel device for changing circular motion to rectilinear motion in which the speed-force characteristic at the opposite ends of the linear stroke are different. More particularly it is an object to provide such a device in which the velocity at one end of the linear stroke is less than the velocity at the other end thereof, with an accompanying greater force. Specifically it is an object to provide a device of this type in which there is a relatively fast outward movement and return at one end of the linear stroke, and a relatively slow outward movement and return at the other end of the stroke, with an accompanying greater force at the slower stroke.

Further objects and advantages of the present invention will be apparent from the following detailed description, reference being had to the accompanying drawing wherein a preferred embodiment of the present invention is shown.

Briefly, the invention comprises a rotatably mounted driving member having a center of rotation, and a driven member carried by the driving member and mounted for rotation relative thereto. The center of rotation of the driven member is fixed relative to the driving member, and the former contains a power take-off member or crank pin offset from the center thereof. The distance between the center of the driven member and the crank pin is greater than the distance between the centers of rotation of the driving and driven members. Guide means are provided for limiting the power take-off member to rectilinear movement when the driving member is rotated.

In the drawing:

Fig. 1 is a front elevational view of a device for changing circular motion to rectilinear motion, constructed in accordance with the teachings of the present invention, Fig. 2 is a side elevational view of the device as viewed from the left side of Fig. 1, Fig. 3 is a fragmentary horizontal diametrical sectional view taken on the line 3—3 in Fig. 1, and Figs. 4 to 11 are schematic views illustrating the position of the driven member and its crank pin at various rotated positions of the driving member.

Referring to the drawing more particularly by reference numerals, 12 indicates generally a device embodying the teachings of the present invention and which includes a base 14 on which are mounted two spaced trunnions 16 and 18.

Rotatably mounted in the trunnions 16 and 18 is a shaft 20 which contains a pulleywheel 22 which is adapted to be driven by a V-belt 24.

A flat driving member 26 is fastened to one end of the shaft 20 normal thereto and contains a cylindrical shaped cavity 28 in the outer face thereof. The center of the cavity 28 is offset from the center of rotation of the member 26, and the cavity 28 includes a side wall 30 and a rear wall 32.

A disc-like driven member 34 is rotatably mounted within the cavity 28 and anti-friction bearings 36 are provided between the peripheral edge of the driven member 34 and the side wall 30.

The driven member 34 may be made in two parts to facilitate its assembly in the cavity 28, the parts being held together by machine screws 37 and a threaded crank pin 38 which extends forwardly from the driven member 34 adjacent its edge. As will be more fully described hereinafter, the crank pin 38 is the power take-off of the device when it is used for changing circular motion to rectilinear motion. The distance between the crank pin 38 and the center of rotation of the driven member 34 is greater than the distance between the centers of rotation of the driving member 26 and the driven member 34.

Mounted adjacent the forward end of the base 14 is an upwardly extending guide assembly 40 which contains two horizontally spaced guide rails 41 and 42 which receive the crank pin 38 between them so as to limit it to rectilinear movement in a horizontal plane when the driving member 26 is rotated, as will more fully appear hereinafter.

Operation

As is readily apparent from the previous description, rotation of the pulley 22 by means of the V-belt 24 causes rotation of the shaft 20 and the driving member 26 fastened to the end thereof.

As the driving member 26 rotates, the driven member 34 attempts to rotate with it but is restrained from doing so by the crank pin 38 being maintained between the guide rails 41 and 42.

Thus, because the crank pin 38 is maintained in a horizontal plane, there will be relative rotational movement between the driven member 34 and the driving member 26.

As the driving member 26 is rotated from the 3 o'clock position through 180° in the clockwise direction (Figs. 4 to 8), the crank pin 38 moves leftwardly toward the center of the driving member 26, and then, as the rotation of the driving member 26 continues beyond 180° (Figs. 8 to 11), the pin 38 returns toward the right.

The amount of movement of the crank pin 38 is equal to twice the distance between the centers of rotation of the driving member 26 and the driven member 34. Thus, the amount of movement of the crank pin 38 and also the amount of force derived from it, can be varied by varying the distance between the centers of rotation of the driving member 26 and the driven member 34. The characteristics of the device can also be varied somewhat by changing the distance between the crank pin 38 and the center of rotation of the driven member 34.

It will be apparent that the size and position of the driven member 34 and the position of the crank pin 38 carried thereby, should be such that the pin 38 does not reach the center of rotation of the driving member 26 during the rotation thereof, because if it does, the driving member 26 and the driven member 34 will rotate together as a unit without any lateral movement of the crank pin 38. As commented on previously, this is prevented if the distance between the center of rotation of the driving member 26 and the center of rotation of the driven member 34 is less than the distance between the pin 38 and the center of rotation of the driven member 34.

From an examination of Figs. 4 to 11 it will be noted that the amount of rectilinear movement of the crank pin 38 for each increment of rotational movement of the driving member 26 is different, depending upon the rotated position of the driving member 26. Thus, the largest increment of movement of the pin 38 occurs during the rotation of the driving member 26 from the position shown in Fig. 5 to the position of Fig. 6, and from the position in Fig. 10 to the position in Fig. 11 when the rectilinear movement is in the opposite direction. Also, there is a greater movement at the outer end of the stroke between the positions in Figs. 4 and 5, than at the other end of the stroke as shown in Figs. 7 and 8.

Thus, the movement of the crank pin 38 is relatively slow at the ends of the stroke, and is slower at the inner end of the stroke than it is at the outer end thereof. Consequently, the amount of force provided at the inner end of the stroke is greater than the force at the outer end so that the device is ideally suited for use in installations such as punch pressers and the like where increased power is necessary at one end of the stroke, or in machine tools such as shapers which have a relatively slow forward or cutting stroke and a relatively fast return stroke.

Because of the novel construction of this device, the only side thrust produced by the crank pin 38 upon rotation of the driving member 26 is that resulting from the frictional force resisting the rotation of the driven member 34 relative to the driving member 26. Thus, if it were possible to have a completely frictionless bearing between the driving member 26 and the driven member 34, there would be no side thrust at all. As it is, the use of high quality anti-friction bearings between the two members reduces the friction to a point where it can be completely ignored for all practical purposes. Consequently, side thrust and its accompanying wear is substantially eliminated by this device.

When the driving member 26 and the driven member 34 are made of material having the same specific gravity, the device is in substantially complete balance at all rotated positions of the driving member 26 because the rotating parts comprise a substantially solid disc-like assembly. The unbalancing produced by the space between the driven member 34 and the side and rear walls of the cavity 28 can be compensated for by increasing the thickness of the driven member 34 by a like amount. Consequently, the maximum rotational velocity of the device is not determined by vibration limitations, as when a conventional type of eccentric mechanism is used, but is limited only by the strength of the material from which the parts are made.

Although the member 26 has been referred to and shown as the driving member, a rectilinear force can be applied to the crank pin 38 whereby the member 34 becomes the driving member and the member 26 becomes the driven member. With this arrangement, the device becomes one for changing rectilinear motion to circular motion.

Furthermore, the present invention is not limited to the specific physical embodiment shown and described because it is apparent that substantially the same results can be obtained by rotatably mounting the driven member 34 on a shaft which is carried by the driving member 26 in a position offset from its center of rotation.

Thus, it is apparent that there has been provided a novel device for changing circular motion to rectilinear motion, and vice versa, which fulfills all of the advantages and objects sought therefor. The side thrust of the crank pin 38 is negligible when high quality anti-friction bearings are used between the driving and the driven members, and for all practical purposes can be ignored. Furthermore, the speed and force at one end of the rectilinear stroke are different from the speed and force at the other end thereof so that the device is ideally suited for use with punch presses, shapers, and the like. In addition, the device is in substantially complete balance for all rotated positions of the driving member.

It is to be understood that the foregoing description and the accompanying drawing have been given only by way of illustration and example and that changes and alterations in the present disclosure, which will be readily apparent to one skilled in the art, are contemplated as within the scope of the present invention which is limited only by the claims which follow.

What is claimed is:

1. A device of the type described, comprising a rotatably mounted driving member having a fixed center of rotation; a driven member supported within the confines of the driving member and mounted for rotation relative thereto, the driven member having a center of rotation in a fixed position relative to the driving member; a power member carried by the driven member and spaced from the center of rotation thereof, the distance between the center of rotation of the driven member and the power member carried thereby being greater than the distance between the centers of rotation of the driving member and the driven member; and guide means restricting the movement of said power member.

2. A device of the type described, comprising a rotatably mounted driving member having a fixed center of rotation; a driven member supported within the confines of the driving member and mounted for rotation relative thereto, the driven member having a center of rotation within the confines of the driving member in a fixed position relative thereto; a power member carried by the driven member and spaced from the center of rotation thereof, the distance between the center of rotation of the driven member and the power member carried thereby being greater than the distance between the centers of rotation of the driving member and the driven member; and guide means restricting the movement of said power member.

3. A device of the type described, comprising a rotatably mounted driving member having a fixed center of rotation; a cylindrical shaped cavity contained in the driving member and having a center offset from the center of rotation thereof; a cylindrical driven member rotatably mounted in said cavity; a power member carried by the driven member offset from the center thereof, the distance between the center of the driven member and the power member being greater than the distance between the center of rotation of the driving member and the center of the driven member; and guide means restricting the movement of said power member upon rotation of the driving member.

4. A device of the type described, comprising a rotatably mounted driving member having a fixed center of rotation; a cylindrical shaped cavity contained in the driving member and having a center offset from the center of rotation thereof; a cylindrical driven member rotatably mounted in said cavity; a power member carried by the driven member offset from the center thereof, the distance between the center of the driven member and the power member being greater than the distance between the center of rotation of the driving member and the center of the driven member; and guide means restricting said power member to rectilinear movement upon rotation of the driving member.

References Cited in the file of this patent

UNITED STATES PATENTS

| | | |
|---|---|---|
| 947,233 | Hammond | Jan. 25, 1910 |
| 1,867,981 | Mudd | July 19, 1932 |
| 2,506,736 | Oschwald | May 9, 1950 |